(12) United States Patent
Hartlieb et al.

(10) Patent No.: US 7,848,126 B2
(45) Date of Patent: Dec. 7, 2010

(54) INTEGRATING CURRENT REGULATOR AND METHOD FOR REGULATING CURRENT

(75) Inventors: Heimo Hartlieb, Graz (AT); Axel Reithofer, Graz (AT); Klaus Strohmayer, Graz (AT)

(73) Assignee: Infineon Technologies AG (DE)

( * ) Notice: Subject to any disclaimer, the term of this patent is extended or adjusted under 35 U.S.C. 154(b) by 552 days.

(21) Appl. No.: 11/842,196

(22) Filed: Aug. 21, 2007

(65) Prior Publication Data

US 2009/0051336 A1    Feb. 26, 2009

(51) Int. Cl.
    *G05F 1/565*    (2006.01)
(52) U.S. Cl. .................. 363/78; 323/284; 327/110
(58) Field of Classification Search ......... 323/282–287; 363/74, 78; 327/108
    See application file for complete search history.

(56) References Cited

U.S. PATENT DOCUMENTS

| | | | | |
|---|---|---|---|---|
| 4,446,410 | A | * | 5/1984 | Yagura et al. ............... 318/687 |
| 6,204,834 | B1 | * | 3/2001 | Baker et al. ................ 345/75.2 |
| 6,222,356 | B1 | * | 4/2001 | Taghizadeh-Kaschani .. 323/288 |
| 6,351,162 | B1 | * | 2/2002 | Schwartz .................... 327/110 |
| 7,109,692 | B1 | | 9/2006 | Wu et al. |

FOREIGN PATENT DOCUMENTS

| | | |
|---|---|---|
| DE | 3212942 | 10/1983 |
| DE | 19929749 | 1/2000 |
| DE | 102004010394 | 9/2004 |

OTHER PUBLICATIONS

Office Action for DE 10 2008 033 466.9-32 dated Nov. 26, 2009.

* cited by examiner

*Primary Examiner*—Harry Behm
(74) *Attorney, Agent, or Firm*—Banner & Witcoff, Ltd.

(57) ABSTRACT

Current regulators and related method for regulating a current through a load. The current regulator may include, for example, a first circuit configured to determine an amount of current that flows through the load; and a second circuit configured to cause a voltage to be applied across the load, the voltage having a duty cycle that depends on the amount of the current flowing through the load.

8 Claims, 6 Drawing Sheets

INTEGRATING CURRENT REGULATOR AND METHOD FOR REGULATING CURRENT

TECHNICAL BACKGROUND

So-called hysteresis regulators or two-point regulators are known for the purpose of regulating a current through an inductive load. In the case of such regulators, a supply voltage is cyclically applied to the load, and a current which flows through the load in this case is determined. In this case, the supply voltage is respectively switched off when the current exceeds a predefined upper limiting value and the supply voltage is switched on again when the current undershoots a predefined lower limiting value. With ideal conditions, that is to say with an exactly triangular profile of the current which rises when the supply voltage is applied and falls when the supply voltage is not applied, the mean value of the current corresponds to the mean value of the upper and lower hysteresis limiting values.

More complex regulators have a closed control loop. In the case of these regulators, a supply voltage is cyclically applied to the load, and a current which flows through the load is determined. A regulator is used to generate a pulse-width-modulated drive signal from the measured value obtained in this manner, said drive signal cyclically driving a switch, which is connected in series with the load, in order to apply the supply voltage to the load.

SUMMARY

Various illustrative embodiments of a current regulator for regulating a current through a load are disclosed. For example, the current regulator may include a first circuit configured to determine an amount of current that flows through the load; and a second circuit configured to cause a voltage to be applied across the load, the voltage having a duty cycle that depends on the amount of the current flowing through the load. Methods performed by the current regulator embodiments are also disclosed.

These and other aspects will be described in the Detailed Description section below.

BRIEF DESCRIPTION OF THE FIGURES

Exemplary embodiments of the invention are explained in more detail below using figures. It should be pointed out that the figures are used to explain a basic principle of the invention and that not necessarily all of the circuit components required for a functional arrangement are illustrated. In the figures, unless specified otherwise, the same reference symbols denote the same signals and circuit components with the same meaning.

DETAILED DESCRIPTION

Figure 1:
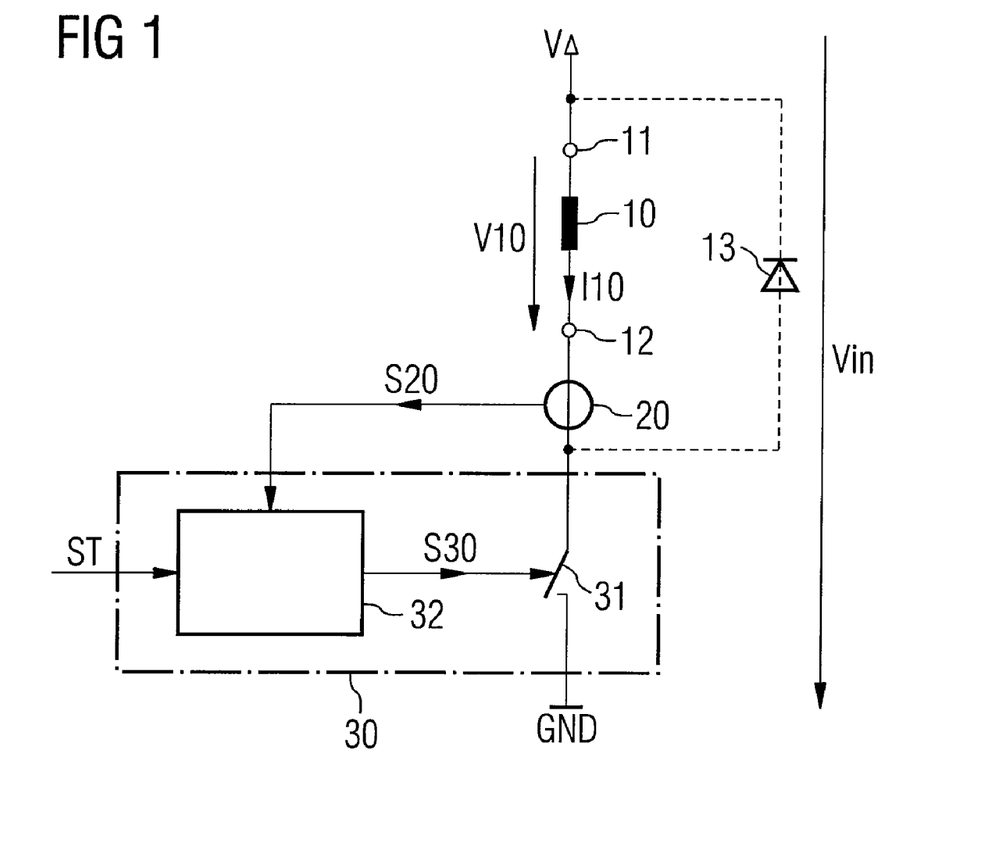
FIG. 1 shows a circuit diagram of one exemplary embodiment of an inventive current regulator which has connecting terminals for a load, a current measuring arrangement and a switching arrangement for applying a pulse-width-modulated supply voltage to the connecting terminals.

One exemplary embodiment of a current regulator according to aspects of the invention is illustrated in FIG. 1. This current regulator has connecting terminals 11, 12 for connecting a load, in particular for connecting an inductive load or a load which is at least encumbered with inductance. Such an inductive load or a load which is encumbered with inductance is explicitly illustrated in FIG. 1 for the sake of better understanding and is denoted using the reference symbol 10. The current regulator also has a switching circuit 30 for applying a pulse-width-modulated supply voltage V10 between the connecting terminals 11, 12 and thus for supplying the load 10. The switching circuit 30 is designed to generate this pulse-width-modulated voltage V10 from an input voltage Vin of the current regulator, said input voltage being applied between a terminal for a first supply potential V and a terminal for a second supply potential GND. The first supply potential V is a positive supply potential, for example. The second supply potential GND is, for example, a reference potential, in particular ground, on which all of the voltages which occur in the circuit may be based. In this case, the magnitude of the input voltage Vin corresponds to that of the supply potential V.

In order to generate the pulse-width-modulated supply voltage V10 from the input voltage Vin, the switching circuit 30 has a switch 31 which is connected to the connecting terminals 11, 12 in such a manner that it is in series with the load if the load 10 is present. In the example illustrated, this switch is connected between the second connecting terminal 12 and the terminal for the second supply potential GND. The first connecting terminal 11 of the current regulator is connected to the terminal for the first supply potential V in this case.

The switch 31 is driven by a pulse-width-modulated drive signal S30 which is generated by a drive circuit 32 in a manner to be explained. The switch 31 is cyclically closed, or turned on, and opened, or turned off, by the drive signal S30, the switch respectively being closed for a switched-on period and being open for a switched-off period, which follows the switched-on period, during a drive cycle. Assuming that unavoidable line resistances are considerably smaller than a resistance of the load 10, approximately the entire supply voltage Vin is applied between the connecting terminals 11, 12 and thus across the load 10 when the switch 31 is closed. During these switched-on periods, the pulse-width-modulated supply voltage V10 assumes a first voltage level which approximately corresponds to the input voltage Vin. When the switch 31 is open, approximately the entire input voltage Vin is applied across the switch 31 and the voltage between the connecting terminals 11, 12, and thus across the load 10, is therefore at least approximately zero. This corresponds to a second voltage level of the pulse-width-modulated supply voltage V10 during the switched-off periods.

The switch 31 is, for example, a semiconductor switch, for example a MOSFET or an IGBT.

The current regulator illustrated in FIG. 1 also has a current measuring circuit 20 which is designed to detect a load current I10 flowing through the load 10 and to generate a current measurement signal S20 which depends on this current, in particular is proportional to this current I10. The inductive load 10 takes up electrical energy during the switched-on periods. In order to avoid high voltages across the switch 31 after the switch 31 has been switched off, said high voltages being caused by the energy which is still stored in the inductive load 10, a freewheeling element 13, for example a diode, may be provided. In order to be able to detect the current through the load both during the switched-on periods and during the switched-off periods, this freewheeling element 13 is connected in such a manner that it is connected in parallel with the series circuit comprising the load 10 and the current measuring circuit 20 when the load 10 is present. For this purpose, according to the example, the freewheeling element 13 is connected between one of the connecting terminals, the first connecting terminal 12 in the example, and a connection of the current measuring circuit 20 which faces away from the other connecting terminal 13.

The current measurement signal S20 generated by the current measuring circuit 20 is supplied to the drive circuit 32 of the switching circuit 30 together with a reference current signal ST. In this case, the reference current signal ST predefines the desired value for the mean value of the current flowing through the load 10. The drive circuit 32 is designed to generate the drive signal S30 for the switch 31 on the basis of a time integral of the current measurement signal S20 and on the basis of a time integral of the reference current signal ST. The drive circuit 32 is designed, for example, to determine a time integral of the reference current signal ST and a time integral of the current measurement signal S20 during a drive cycle, to compare the integrals obtained thereby at least during the switched-off period of the drive signal, and to begin a new drive cycle when the integral of the current measurement signal S20 undershoots the integral of the reference current signal ST. A duty ratio of the pulse-width-modulated supply voltage V10, that is to say the ratio between the switched-on duration and the switched-off duration or between the switched-on duration and the duration of the drive cycle, thus depends on the integral of the current measurement signal S20 and on the integral of the reference current signal ST in the case of this current regulator.

In the current regulator illustrated in FIG. 1, the switch 31 of the switching circuit 30 and the current measuring circuit 20 are connected between the second connecting terminal 12 and the terminal for the second supply potential GND. This should be understood as being only an example. The current measuring circuit 20 and the switch 31 could thus also be connected between the terminal for the first supply potential V and the first connecting terminal 11, or one of these two circuit components could be connected between the terminal for the first supply potential V and the first connecting terminal 11 and the other of these circuit components could be connected between the second connecting terminal 12 and the terminal for the second supply potential GND.

Figure 2:
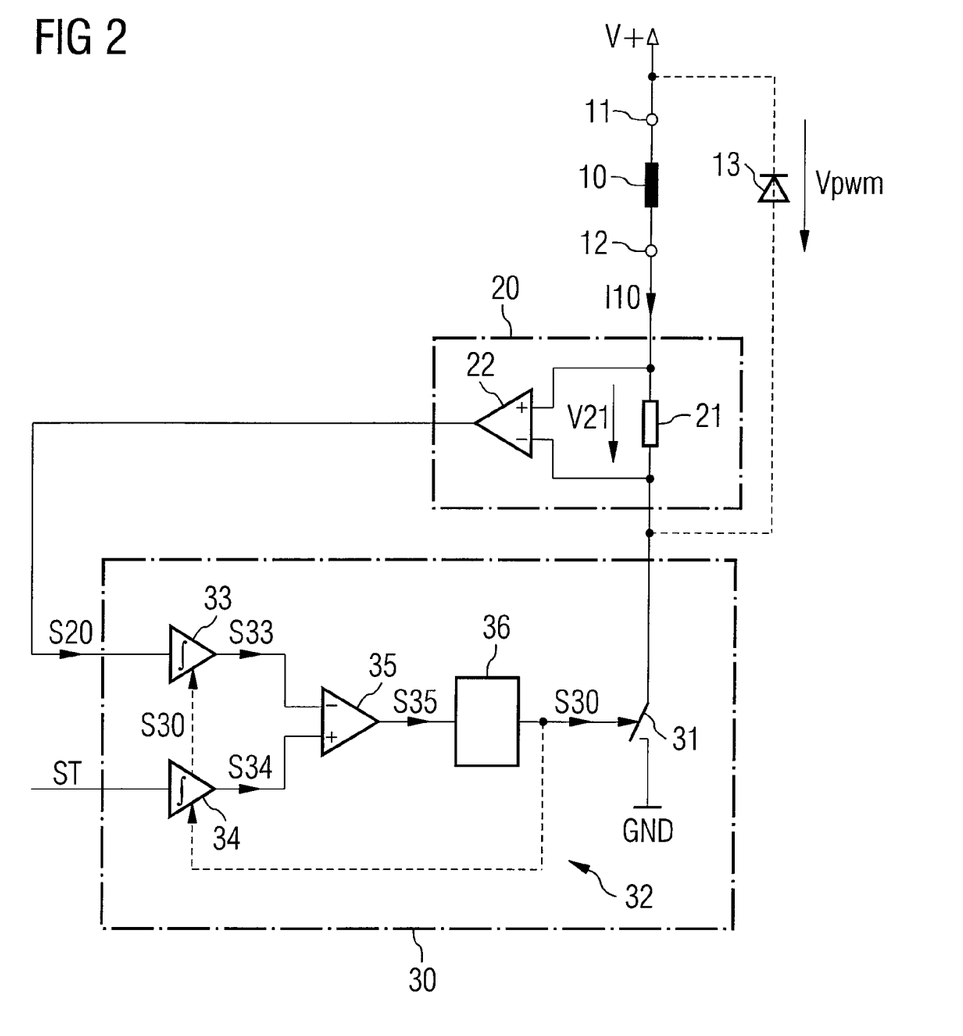
FIG. 2 shows a circuit diagram of the current regulator shown in FIG. 1, with exemplary embodiments of the current measuring arrangement and of the switching arrangement being illustrated in detail.

Referring to FIG. 2, the current measuring circuit 20 has, for example, a current measuring resistor 21 which is connected in series with the load 10 and the switch 31. This current measuring resistor 21 is, for example, a nonreactive resistor; a voltage drop V21 across this current measuring resistor is then directly proportional to a load current I10 flowing through the load 10 when the switch 31 is closed. In order to detect this voltage drop V21 and to provide the current measurement signal S20, the current measuring circuit 20 also has a current measuring amplifier 22 which is in the form of an operational amplifier, for example, and is connected in such a manner that the current measuring resistor 21 is between the inputs of the current measuring amplifier 22. The current measurement signal S20 is available at the output of the current measuring amplifier 22.

Referring to FIG. 2, the drive circuit 32 has, for example, a first integrator 33 which is supplied with the current measurement signal S20 and provides a first integration signal S33 which depends on this current measurement signal S20. The drive circuit 32 also has a second integrator 34 which is supplied with the reference current signal ST and provides a second integration signal S34 which depends on this reference current signal ST. The integration signals S33, S34 are supplied to a comparator 35 which compares these two integration signals and generates a comparison signal S35 which depends on this comparison. This comparison signal S35 is supplied to a pulse width modulator 36 which generates the pulse-width-modulated signal S30 for driving the switch 31 on the basis of the comparison signal S35.

Figure 3:
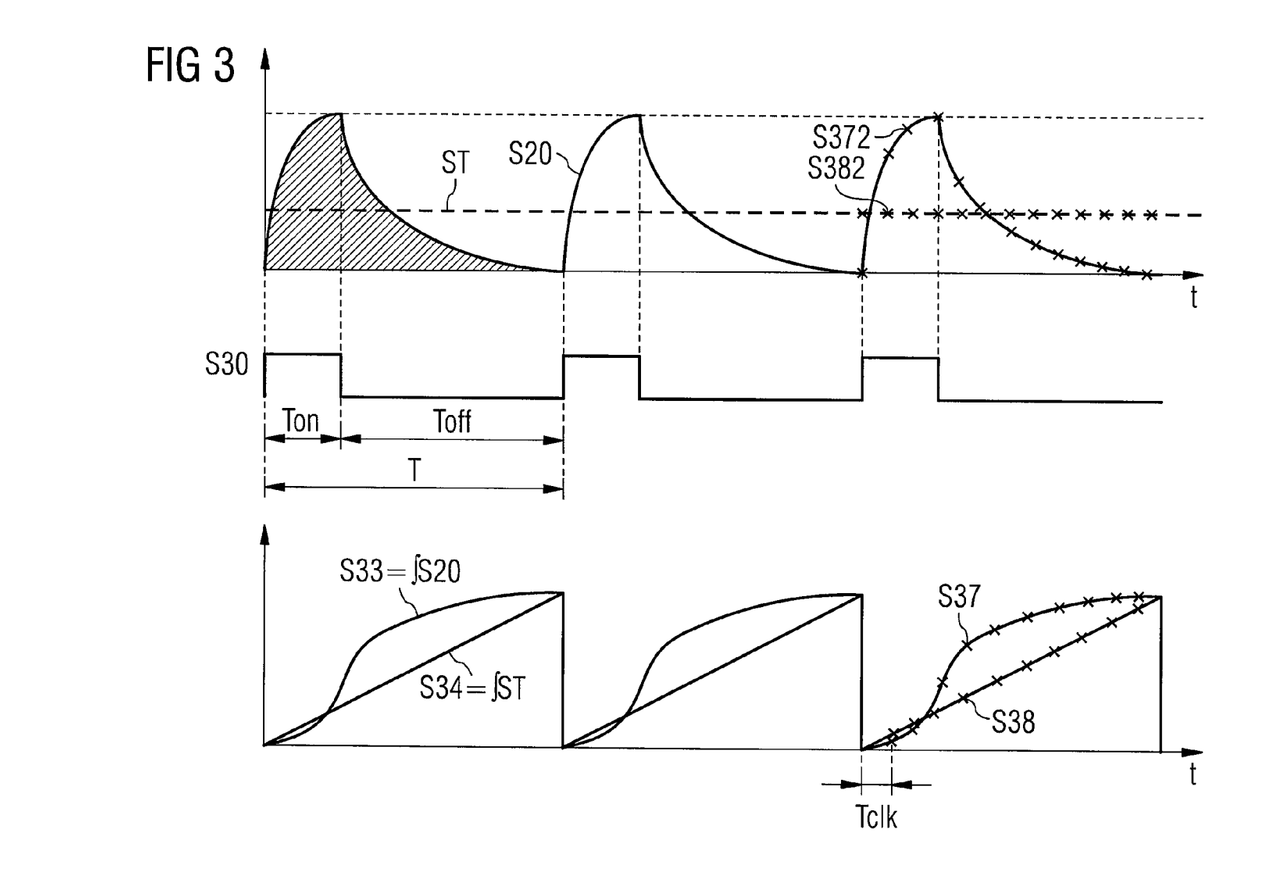
FIG. 3 illustrates a method of operation of the current regulator illustrated in FIGS. 1 and 2 using time profiles of signals which occur in the current regulator.

The method of operation of the current regulators illustrated in FIGS. 1 and 2 and, in particular, the method of operation of the drive circuit 30 which generates the pulse-width-modulated signal S30 are explained below using FIG. 3. FIG. 3 shows illustrative time profiles of the current measurement signal S20, of the reference current signal ST, of the pulse-width-modulated drive signal S30 and of the first and second integration signals S33, S34.

For the purposes of explanation, it is assumed that the reference current signal ST is a constant signal which does not vary the desired power consumption of the load, that is to say the desired value of the power consumption, during the period of time considered using FIG. 3. It is also assumed that, on account of parasitic effects, for example line resistances or a nonreactive resistance component of the inductive load, the time profile of the load current I10 and thus the time profile of the current measurement signal S20 in this example are not triangular, as would be the case with ideal inductive loads which are operated below their saturation region. In the exemplary embodiment illustrated in FIG. 3, the current through the load 10 rises, exponentially in sections, when the switch 31 is closed, that is to say during a switched-on period Ton, and falls, exponentially in sections, when the switch is open, that is to say during a switched-off period Toff. Apart from parasitic effects, saturation effects may also play a role in the time profile illustrated, said saturation effects occurring when the switched-on durations are so long that the inductive load 10 goes into saturation. For the purposes of explanation, it is also assumed for the time profiles illustrated in FIG. 3 that the switch 31 turns on when the drive signal S30 assumes a high level and the switch 31 turns off when the drive signal S30 assumes a low level.

The integrators 33, 34 of the drive 32 illustrated in FIG. 2 are designed to respectively integrate the current measurement signal S20 and the reference current signal ST from the beginning of a drive cycle and starting from identical initial values, for example zero. For the purposes of explanation, it is assumed that a new drive cycle respectively begins with the beginning of a switched-on period of the switch 31. In this case, the integrators 33, 34 are respectively reset to the initial value, for example by the drive signal S30, at the beginning of a drive cycle. Such resetting is respectively effected, for example, with a rising edge of the pulse-width-modulated drive signal S30.

Whereas the second integration signal S34, which represents a time integral of the reference current signal ST, rises linearly over time from the beginning of a drive cycle, the rate of rise of the first integration signal S33, which represents the time integral of the current measurement signal S20, varies. For the time profile of the load current or the current measurement signal S20, which is illustrated in FIG. 3, the first integration signal S33 is first of all smaller than the second integration signal S34 but quickly exceeds the second integration signal S34 after the beginning of the drive cycle.

In the drive circuit 32 illustrated in FIG. 2, the comparison signal S35 performs the function of a switch-on signal which predefines the beginning of a switched-on period of the switch 31. The switched-on duration Ton, that is to say the duration of a switched-on period, is constant for all drive cycles in the example illustrated. In contrast, the switched-off duration Toff or the duration of the switched-off period, and thus a total duration T of a drive cycle, can be varied in order to regulate the power consumption. The end of a drive cycle, and thus the beginning of a new drive cycle, are respectively reached in the example illustrated when the first integration signal S33 undershoots the value of the second integration signal S34 after the switch 31 has been opened, that is to say during the switched-off period. In the case of the drive circuit 32 illustrated in FIG. 2, there is a rising edge of the comparison signal or switch-on signal S35 at such a point in time.

Figure 4:
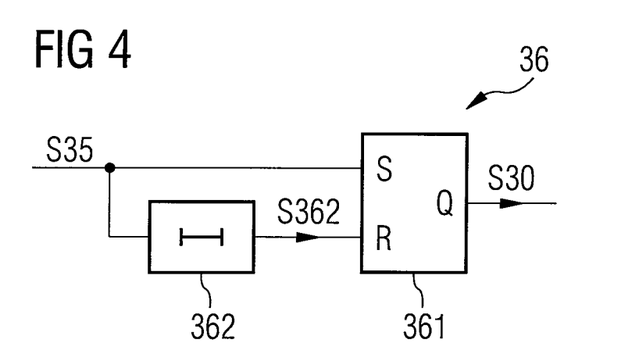
FIG. 4 shows a circuit diagram of a first exemplary embodiment of a pulse width modulator present in the switching arrangement shown in FIG. 2.

FIG. 4 illustrates one exemplary embodiment of a pulse width modulator 36 which generates a switch-on level of the pulse-width-modulated signal S30 in accordance with the switch-on signal S35, and thus switches on the switch 31, and generates a switch-off level of the drive signal S30 after a predefined switched-on duration Ton has elapsed, and thus switches off the switch 31. The pulse width modulator 36 illustrated has an RS flip-flop 361 having a set input S, a reset input R and a noninverting output Q at which the pulse-width-modulated drive signal S30 is available. The switch-on signal S35 is supplied to the set input S. The flip-flop 361 illustrated is set upon a predefined edge of the switch-on signal S35, for example a rising edge, as a result of which the pulse-width-modulated signal S30 assumes a predefined signal level, a high level in the example. The pulse width modulator 36 also has a delay element 362 which is likewise supplied with the switch-on signal S35. An output signal S362 from this delay element is supplied to the reset input R of the flip-flop 361. The delay element 362 forwards the switch-on signal S35 to the reset input R of the flip-flop 361 with a predefined delay time corresponding to the switched-on duration Ton, with the result that the flip-flop 361 which has been set is reset again after the switched-on duration has elapsed and the drive signal S30 assumes a switch-off level, a low level in the example, after the switched-on duration has elapsed.

Figure 5:
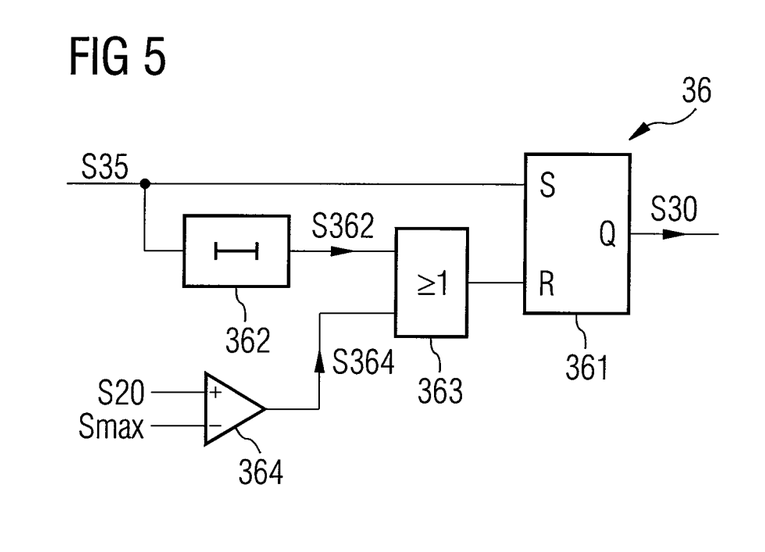
FIG. 5 shows a circuit diagram of a second exemplary embodiment of the pulse width modulator.

FIG. 5 shows another exemplary embodiment of the pulse width modulator 36. This pulse width modulator differs from that illustrated in FIG. 4 by virtue of an OR gate 363 which is connected upstream of the reset input R of the flip-flop 361 and one of the inputs of which is supplied with the delay signal S362 available at the output of the delay element 362 and the other input of which is supplied with an overcurrent switch-off signal S364. This overcurrent switch-off signal S364 is available at the output of a comparator 364, one of the inputs of which is supplied with the current measurement signal S20 and the other input of which is supplied with a maximum current signal Smax. In this case, the maximum current signal Smax represents a maximum permissible load current. In this pulse width modulator 36, the flip-flop 361 is reset when the delay signal S362 assumes a high level or when the overcurrent switch-off signal S364 assumes a high level, that is to say when either the switched-on duration has elapsed or when the load current I10 exceeds a maximum permissible current before the switched-on duration elapses. The pulse width modulator 36 illustrated in FIG. 5 thus ensures that the current regulator is protected against overcurrents.

Figure 6:
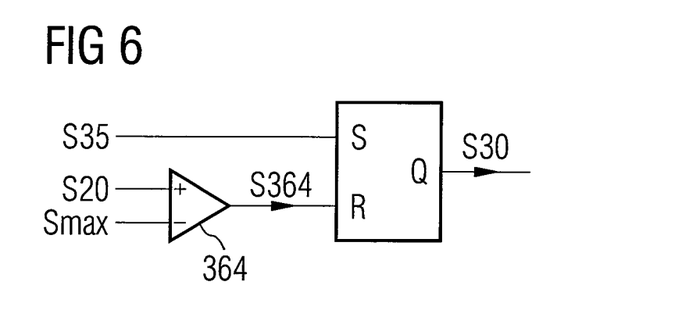
FIG. 6 shows a circuit diagram of a third exemplary embodiment of the pulse width modulator.

FIG. 6 shows another exemplary embodiment of the pulse width modulator. In contrast to the pulse width modulator shown in FIG. 5, this pulse width modulator does not have a delay element for setting a constant switched-on duration. In the case of this pulse width modulator, the flip-flop 361 is reset only on the basis of a comparison of the current measurement signal S20 with the maximum current signal Smax. To this end, the reset input R of the flip-flop 361 is supplied only with the output signal S364 from the comparator 364. When this pulse width modulator is used, the load current always rises during the switched-on periods to a current value determined by the maximum current value Smax, and the switched-on duration Ton can thus vary for different loads and for different input voltages Vin.

In order to generate the integration signals S33, S34, the current regulator illustrated in FIG. 2 contains integrators 33, 34 which continuously integrate the current measurement signal S20 and the reference current signal ST over time. These integrators 33, 34 have, for example, voltage-controlled current sources and capacitances which are connected downstream of the current sources in a manner which is not illustrated. In this case, the current sources generate currents which depend on the current measurement signal S20 and on the reference current signal ST and charge the capacitances starting from an initial value. In this case, a voltage across the capacitances corresponds to the integration signals S33, S34.

Figure 7:
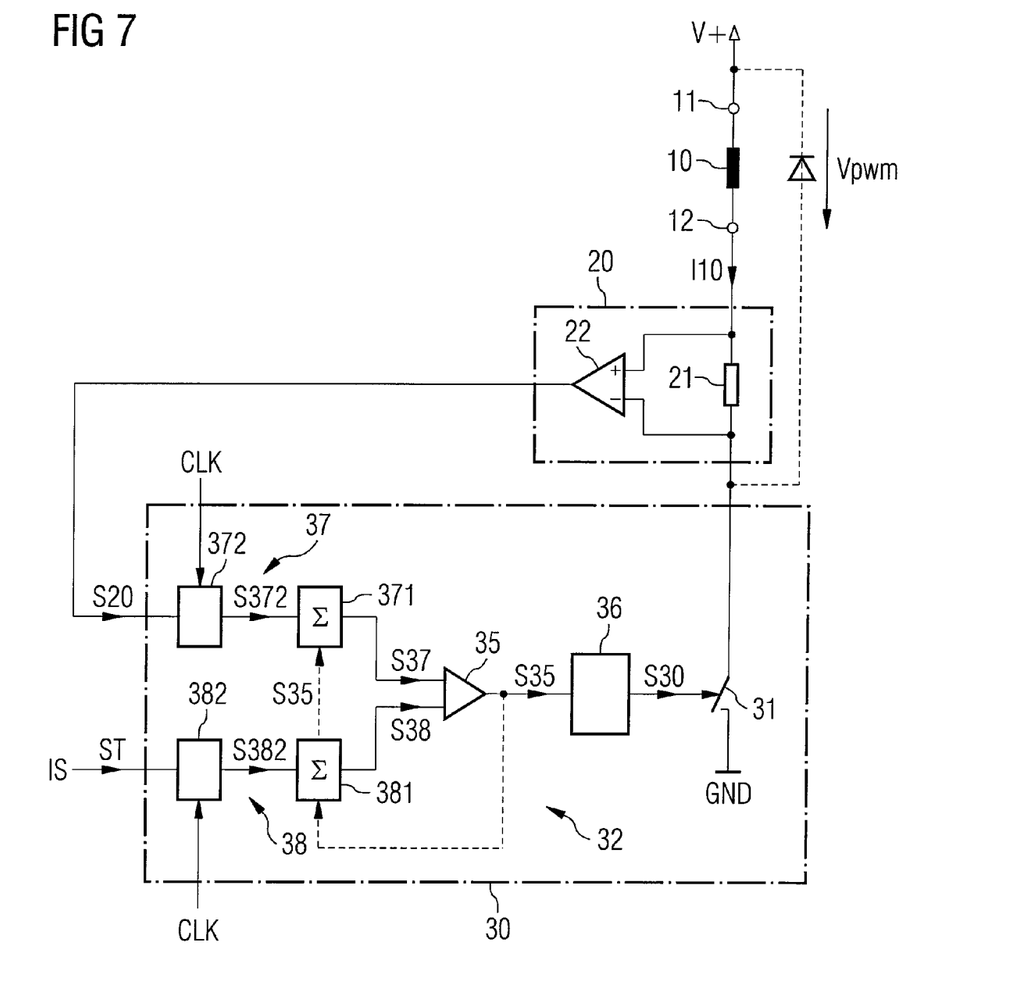
FIG. 7 shows a circuit diagram of another exemplary embodiment of an inventive current regulator.

Instead of continuous integrators 33, 34 for generating the integration signals S33, S34, discrete-time integrators 37, 38 which add the sample values S372, S382 of the current measurement signal S20 and of the reference current signal ST may also be used with reference to FIG. 7. These discrete integrators 37, 38 have, for example, sampling elements 372, 382 which, in accordance with a clock signal CLK, sample the current measurement signal S20 and the reference current signal ST at regular intervals of time predefined by the clock signal CLK and generate the sample values S372, S382. In this case, adders 371, 381 which respectively add the sample values S372, S382 starting from an initial value, for example zero, are connected downstream of the sampling elements 372, 382. These adding elements 371, 381 are respectively reset to their initial value at the beginning of a drive cycle, for example using the pulse-width-modulated signal S30. Signals S37, S38 which are available at outputs of the adding elements 371, 381 and perform the function of the continuous signals S33, S34 explained using FIG. 2 represent discrete-time integration signals of the current measurement signal S20 and of the reference current signal ST. These discrete-time signals S37, S38 are supplied to a comparator 35, at the output of which the switch-on signal S35 is available, said switch-on signal depending on the comparison of these discrete-time integration signals S37, S38.

For the sake of better understanding, FIG. 3 illustrates the sample values S372, S382 of the current measurement signal S20 and of the reference current signal ST as well as the resulting discrete-time integration signals S37, S38 for one of the drive cycles. In this case, Tclk denotes the duration of a sampling period within which the current measurement signal S20 and the reference current signal ST are respectively sampled once. The following applies to a sampling frequency: fclk=1/Tclk. The two signals S20, ST are respectively sampled at the same points in time. As in the continuous-time case, the switch-on signal S35 assumes a signal level which starts a new switched-on period when the first integration signal S37, which depends on the current measurement signal S20, falls below the value of the second integration signal S38 which depends on the reference current signal ST.

It should be pointed out that an "integration signal" in connection with the invention should be understood as meaning both a continuous-time integration signal, which is formed by means of continuous-time integration of the current measurement signal S20 or of the reference current signal ST, and a discrete-time integration signal, which is formed by adding sample values of the current measurement signal S20 or of the reference current signal ST.

Figure 8:
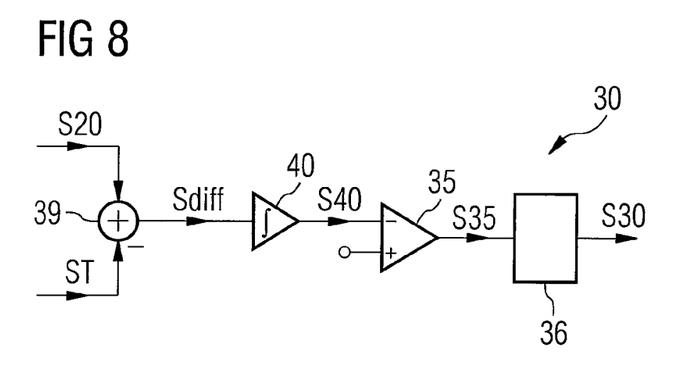
FIG. 8 shows a circuit diagram of another exemplary embodiment of a drive circuit for generating a pulse-width-modulated signal for a switch of the switching arrangement, in which the switch is connected in series with the load.

FIG. 8 illustrates another exemplary embodiment of the drive circuit 30 for generating the pulse-width-modulated drive signal S30. This drive circuit 30 has a subtractor 39 which is supplied with the current measurement signal S20 and the reference current signal ST and at whose output a difference signal Sdiff, which represents a difference between the current measurement signal S20 and the reference current signal ST, is available. This difference signal Sdiff is supplied to an integrator 40 which integrates the difference signal Sdiff and generates an integration signal S40. In contrast to the exemplary embodiments explained above, this integrator 40 does not have to be reset at the beginning of a drive cycle. The integration signal S40 is supplied to a comparator 35 which is used to detect zero points of the integration signal S40 and, for this purpose, compares the integration signal S40 with a reference potential GND or with zero, for example.

Figure 9:
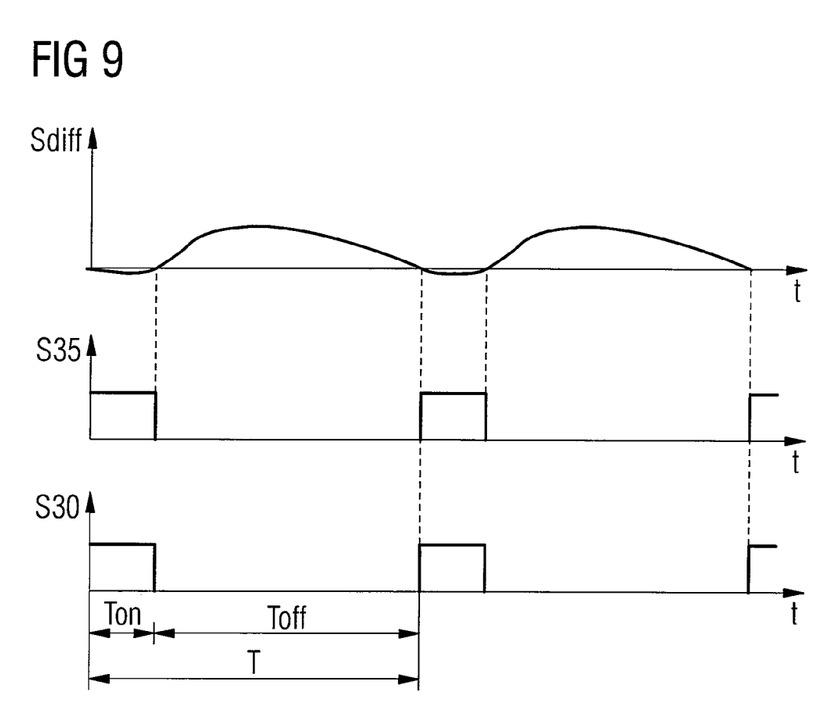
FIG. 9 illustrates the method of operation of the drive circuit shown in FIG. 8 using time profiles of signals which occur in the drive circuit.

FIG. 9 illustrates the time integral S40 of the difference signal Sdiff on the basis of the time profiles for the current measurement signal S20 and for the reference current signal ST which are illustrated in FIG. 3. FIG. 9 also illustrates the comparison signal S35 which results from this integrated difference signal assuming that the comparator 35 is implemented in such a manner that the comparison signal S35 respectively assumes a high level when the integral S40 of the difference signal Sdiff is less than zero and respectively assumes a low level when the integral S40 of the difference signal Sdiff is greater than zero. In the drive circuit 30 illustrated in FIG. 8, a drive cycle, that is to say the beginning of a switched-on period, respectively begins with a rising edge of the output signal S35 from the comparator 35, that is to say with a rising edge of the switch-on signal. The duration Ton of the switched-on period is determined by the pulse width modulator 36 in a manner which has already been explained. FIG. 9 likewise illustrates a time profile of the drive signal S30 on the basis of the switch-on signal S35 for the purpose of better understanding.

In the case of a current regulator having a drive circuit 30 shown in FIG. 8, the ratio between the switched-on duration Ton and the switched-off duration Toff depends on the integral of the difference Sdiff between the current measurement signal S20 and the reference current signal ST and thus depends on the difference between integral of the current measurement signal S20 and the integral of the reference current signal ST.

In the case of the drive circuit 30 illustrated in FIG. 8, the continuous-time integrator 40 can be replaced with a sampling element and an adder, which is connected downstream of the sampling element, in accordance with the statements made with respect to FIG. 7 and in a manner which is not illustrated in any more detail.

The current regulator explained above and the current regulating method explained using this current regulator function independently of the type of load used and, in particular, independently of whether the inductive load 10 goes into saturation during the switched-on period. In addition, the current regulator and the current regulating method are able to react quickly to changes in the reference current value ST; it takes only one drive cycle for the mean value of the current I10 flowing through the load 10 to be regulated to the new reference value. In addition, the current regulator and the current regulating method are robust to changes in the input voltage Vin.

The invention claimed is:

1. A current regulator for regulating a current through a load, the current regulator comprising:
   a current measuring circuit configured to determine an amount of current that flows through the load and to generate a current measurement signal that depends on the amount of current; and
   a switching circuit configured to cycle between a first state and a second state, and configured to receive a reference current signal and cause a supply voltage to be applied across the load, the supply voltage having a first voltage level during the first state and a second voltage level during the second state, wherein the switching circuit is further configured to integrate the difference between the current measurement signal and the reference current signal during each drive cycle to obtain a difference integration signal, and to begin a new drive cycle responsive to the difference integration signal reaching a predefined threshold value after an end of a duration of the first state, the duration of the first state is constant for all drive cycles.

2. A current regulator for regulating a current through a load, the current regulator comprising:
   a current measuring circuit configured to determine an amount of current that flows through the load and to generate a current measurement signal that depends on the amount of current; and
   a switching circuit configured to cycle between a first state and a second state, and configured to receive a reference current signal and cause a supply voltage to be applied across the load, the supply voltage having a first voltage level during the first state and a second voltage level during the second state, wherein the switching circuit is further configured to integrate both the current measurement signal and the reference current signal over time to obtain the time integrals of the current measurement signal and of the reference current signal during each drive cycle, and to begin a new drive cycle responsive to the integral of the current measurement signal being less than the integral of the reference current signal after an end of the duration of the first state, the duration of the first state is constant for all drive cycles.

3. The current regulator of claim 2, wherein the switching circuit is configured to integrate the current measurement signal and the reference current signal in a continuous-time manner in order to obtain the time integrals of the current measurement signal and of the reference current signal.

4. The current regulator of claim 2, wherein the switching circuit is configured to sum sample values of the current measurement signal and of the reference current signal in order to obtain the time integrals of the current measurement signal and of the reference current signal.

5. A method for regulating a current through a load, the method comprising:
   applying a supply voltage to the load, the supply voltage cycling between having a first voltage level during a first period and a second voltage level during a second period;
   generating a current measurement signal that depends on an amount of current flowing through the load;

integrating the difference between the current measurement signal and the reference current signal during each drive cycle to obtain a difference integration signal; and beginning a new drive cycle, responsive to the difference integration signal reaching a predefined threshold value after an end of a duration of the first period, the duration of the first period is constant for all drive cycles.

6. A method for regulating a current through a load, the method comprising:

applying a supply voltage to the load, the supply voltage cycling between having a first voltage level during a first period and a second voltage level during a second period; and generating a current measurement signal that depends on an amount of current flowing through the load;

integrating both the current measurement signal and the reference current signal over time to obtain the time integrals of the current measurement signal and of the reference current signal during each drive cycle; and beginning a new drive cycle responsive to the integral of the current measurement signal being less than the integral of the reference current signal after an end of the duration of the first period, the duration of the first period is constant for all drive cycles.

7. The method of claim 6, further comprising integrating the current measurement signal and the reference current signal in a continuous-time manner to obtain the time integrals of the current measurement signal and of the reference current signal.

8. The method of claim 6, further comprising summing sample values of the current measurement signal and of the reference current signal to obtain the time integrals of the current measurement signal and of the reference current signal.

* * * * *